United States Patent [19]

Doyle

[11] Patent Number: 4,671,629
[45] Date of Patent: Jun. 9, 1987

[54] MICROSCOPE FOR EXAMINING THE SURFACE FINISH OF FIBER OPTIC ENDS

[75] Inventor: Ralph R. Doyle, Arlington Heights, Ill.

[73] Assignee: Buehler Ltd., Lake Bluff, Ill.

[21] Appl. No.: 604,045

[22] Filed: Apr. 26, 1984

[51] Int. Cl.⁴ .................. G02B 21/00; G01N 21/00
[52] U.S. Cl. .......................... 350/523; 350/96.10; 350/507; 356/73.1
[58] Field of Search ............ 350/96.10, 96.20, 96.21, 350/96.24, 96.25, 96.26, 96.29, 96.30, 507, 523, 526; 362/32; 356/73.1

[56] References Cited

U.S. PATENT DOCUMENTS

| 4,474,469 | 10/1984 | Abe | 356/399 |
| 4,527,870 | 7/1985 | Esmay | 350/523 |
| 4,595,265 | 6/1986 | Hodgson et al. | 350/523 |

OTHER PUBLICATIONS

Burtsev et al, "Projection Instrument for Inspecting Glass-Fiber Bundles" Sov. J. of Opt. Tech. vol. 48, No. 2, 2/81, pp. 78-79.

Hillerich, "On Site Location of Optical Fiber Defects . . . Pro. of 26th Int. Wire and Cable Sym. Cherry Hill, USA 11/77, pp. 373-379.

Primary Examiner—William L. Sikes
Assistant Examiner—Brian M. Healy
Attorney, Agent, or Firm—Charles F. Pigott, Jr.

[57] ABSTRACT

A surface inspection microscope for examining the surface finish of a fiber optic end, the microscope including a fitting for attaching the end of a fiber optic connector, an eyepiece for viewing the fiber optic end, a light source within the microscope for transmitting light along the length of the optic cable, and reflector means for positioning against the opposite end of the fiber optic cable to reflect light from the light source back along the length of the fiber optic cable thereby enhancing the contrast between the end of the fiber optic core and the cladding material which surrounds the core.

1 Claim, 3 Drawing Figures

U.S. Patent   Jun. 9, 1987   4,671,629
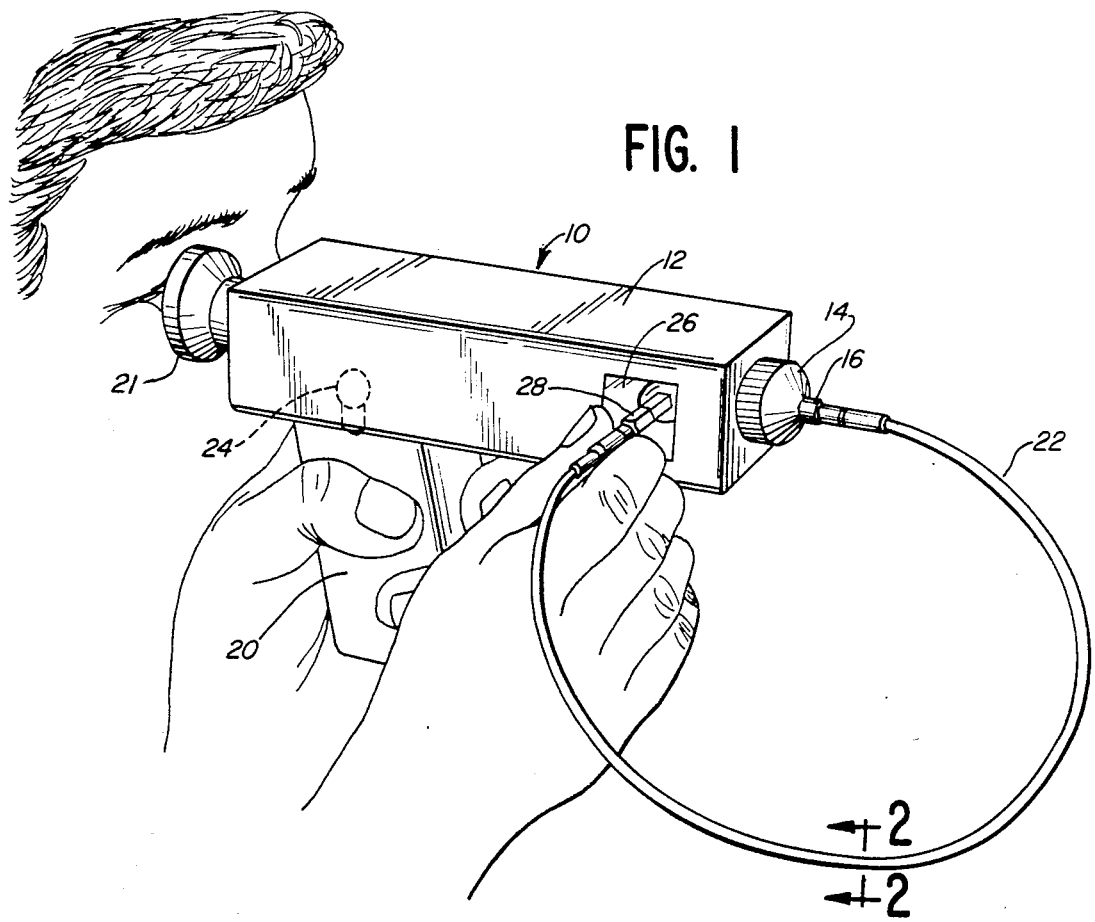
FIG. 1
FIG. 2
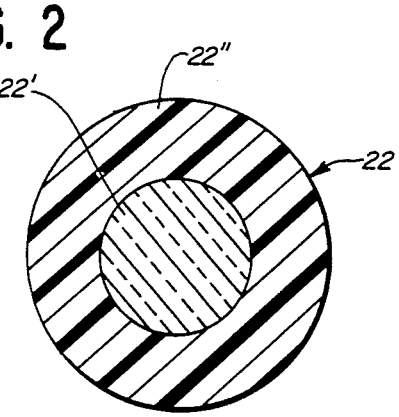
FIG. 3
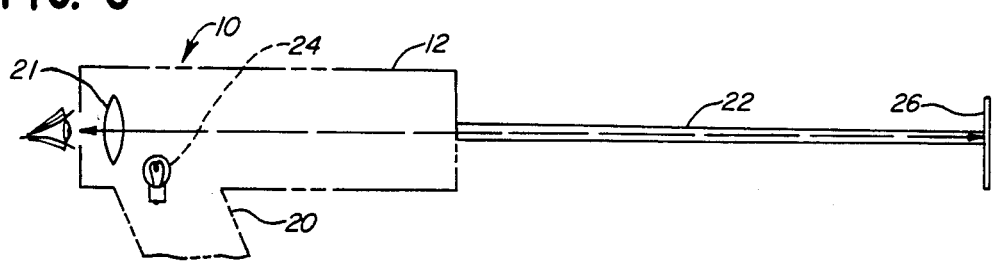

4,671,629

MICROSCOPE FOR EXAMINING THE SURFACE FINISH OF FIBER OPTIC ENDS

BRIEF SUMMARY OF THE INVENTION

Fiber optic cables have gained increased use in a number of applications such as in computer interconnection, process controls, industrial automation, data transmission links, and communication in general. Such fiber optic connectors generally comprise a glass core which is clad with an outer layer of material for protective covering of the core. Such fiber optic connectors may be interconnected to one another by end-to-end contact, and to facilitate such connection it is necessary that the fiber optic ends be properly polished and free of defects so as to transmit light signals with a minimum of loss.

Apparatus for polishing fiber optic ends is disclosed in my pending application, U.S. Ser. No. 555,806, filed Nov. 28, 1983, now abandoned. The present invention relates to microscope apparatus and a method for inspection of a polished fiber optic end to detect any defects which would cause a loss of signal transmission.

It is known to provide a microscope for examining a fiber optic end. Such a microscope includes a fitting to which a fiber optic connector end may be attached through use of a connector adapter. When the end of a fiber optic connector has thus been attached to a fitting on the microscope, an operator may look through an eyepiece and examine the end of the optic connector. Such a microscope normally includes a light source, such as a battery-powered bulb located within the microscope, for illuminating the fiber optic end.

Use of a microscope as described above is not entirely satisfactory for examining the end of a fiber optic connector. This is because there is not sufficient contrast between the optic core and the cladding material which surrounds the core. The purpose of such a visual inspection of a polished optic end is to check for severe scratches, chipping, cracks, pits or dirt or the like. However, defects in the optic core are more important than defects in the cladding material, and thus it is important to be able to differentiate between the optic core and the cladding material.

It has been found that backlighting of the optic cable will enhance the contrast between the optic core and the cladding material so as to highlight the core and facilitate inspection thereof. Such backlighting will cause the core to appear significantly brighter than the cladding material. In order to produce backlighting, it is known to provide a second light source associated with the microscope which is aimed at the opposite end of the optic cable being examined, thereby backlighting the optic connector and enhancing the contrast between the core and the cladding material.

The object of the present invention is to provide means for backlighting a fiber optic cable, having one end connected to a microscope, without the need of providing a second light source or a tap-off from the primary light source.

A more specific object of my invention is to provide reflector means for positioning against the opposite end of a fiber optic cable which has one end attached to a microscope, whereby such reflector means reflects light from the primary light source back along the length of the optic cable thereby backlighting the same.

The foregoing and other objects and advantages of my invention will be apparent from the following description of a preferred embodiment, taken in conjunction with the accompanying drawing.

DESCRIPTION OF THE DRAWINGS

FIG. 1 is a perspective view showing a microscope equipped with reflector means in accordance with the present invention;

FIG. 2 is an enlarged sectional view, taken along the line 2—2 of FIG. 1, showing the cross-section of an optic fiber including a core and a covering of cladding material; and FIG. 3 is a schematic illustration showing a microscope having an internal light source, an optic cable with one end attached to the microscope, and a reflector positioned against the opposite end of the cable to reflect light from the light source back along the length of the cable.

Now, in order to acquaint those skilled in the art with the manner of making and using my invention, I shall describe, in conjuction with the accompanying drawings, a preferred embodiment of my invention.

DETAILED DESCRIPTION OF THE INVENTION

Referring to the drawings, FIG. 1 shows a microscope 10 having a housing 12, and a fitting 14 to which a connector 16 may be connected by a threaded connection or the like. The connector 16 is of a known type and may be fitted on one end of a fiber optic cable 22, and then the connector is connected to the fitting 14 for attaching the end of the optic cable to the microscope.

The foregoing operation is normally carried out after the end of the fiber optic connector has been polished and it is desired to inspect the same for any defects. The microscope 10 includes a handle 20, and an eyepiece 21 whereby an operator may look through the eyepiece and visually inspect the attached end of the fiber optic cable.

There is shown in dash lines in FIG. 1 a schematic representation of a light bulb 24 which may be battery-powered and is located within the microscope for illuminating the attached end of the optic connector being inspected. Such a known light source will cause light to be transmitted along the length of the optic cable and thereby aid in the inspection of the optic end.

FIG. 2 is an enlarged showing of the cross-section of the optic fiber cable 22 showing a glass core 22' and an outer cover or cladding material 22". As noted above, defects in the optic core 22' are more important than defects in the cladding material 22". Therefore, it is important to be able to distinguish between the core and the cladding material when inspecting an optic end.

It is an important feature of the present invention to provide reflector means 26 for backlighting the optic cable 22 without need for a second light source or a tap-off from the primary light source 24. FIG. 1 shows a small piece of metal foil 26 which is secured to the side of the housing 12 and provides a mirror surface against which the opposite end of the optic cable 22 may be positioned.

The opposite end of the optic cable 22 is shown in FIG. 1 as having a connector 28 attached thereto, and the connector 28 may simply be held against the mirror surface or foil 26 to reflect light from the primary light source 24 back along the length of the connector 22 thereby backlighting the cable 22. It is known that such backlighting will enhance the contrast between the core 22' and the cladding material 22" during visual inspection of the attached end of the optic connector by causing the core to appear brighter than the cladding material, and by means of the present invention it is possible to provide such backlighting without use of a second light source.

It will be understood that various types of mirror surfaces 26 may be utilized within the scope of the present invention for the purpose of reflecting light from the primary source 24 back along the length of the optic cable 22. It will also be appreciated that the mirror surface 26 may be located on any convenient part of the microscope, or proximate thereto, in any position where the opposite end of the optic connector may be held against the mirror surface.

I claim:

1. A surface inspection microscope for examining the surface finish of one end of a length of fiber optic of the type having a core surrounded by cladding material, said microscope including, in combination, an elongated housing, a fitting for attaching one end of said length of fiber optic to one end of said housing, an eyepiece attached at the opposite end of said housing to permit visual inspection of the surface of said one end of said length of fiber optic through said eyepiece, a light bulb within said housing to transmit a constant beam of light into said one end of said length of fiber optic, and a flat mirror mounted on an outside wall of said housing against which the opposite end of said length of fiber optic may be manually held for transmitting light from said light bulb back along the length of said fiber optic to facilitate said visual inspection by aiding in the differentiation between said core and said cladding.

* * * * *